(12) United States Patent
Zhu

(10) Patent No.: US 8,948,123 B2
(45) Date of Patent: Feb. 3, 2015

(54) ENHANCED CONTROL SIGNALS MULTIPLEXED WITH DATA SIGNALS

(75) Inventor: Chenxi Zhu, Fairfax, VA (US)

(73) Assignee: Fujitsu Limited, Kawasaki-shi (JP)

( * ) Notice: Subject to any disclaimer, the term of this patent is extended or adjusted under 35 U.S.C. 154(b) by 196 days.

(21) Appl. No.: 13/617,648

(22) Filed: Sep. 14, 2012

(65) Prior Publication Data

US 2013/0195072 A1 Aug. 1, 2013

Related U.S. Application Data

(60) Provisional application No. 61/593,705, filed on Feb. 1, 2012.

(51) Int. Cl.
*H04W 72/04* (2009.01)
*H04W 72/12* (2009.01)

(52) U.S. Cl.
CPC ........ *H04W 72/042* (2013.01); *H04W 72/1289* (2013.01)
USPC .......................................................... 370/330

(58) Field of Classification Search
USPC ................... 370/328, 329, 330, 522; 455/450
See application file for complete search history.

(56) References Cited

U.S. PATENT DOCUMENTS

| | | | | |
|---|---|---|---|---|
| 8,335,196 B2 * | 12/2012 | Das et al. | ...................... | 370/337 |
| 8,774,101 B2 * | 7/2014 | Lim et al. | ...................... | 370/329 |
| 2003/0224731 A1 * | 12/2003 | Yamaura et al. | ............. | 455/63.3 |
| 2005/0245258 A1 * | 11/2005 | Classon et al. | ................ | 455/434 |
| 2010/0120442 A1 | 5/2010 | Zhuang et al. | | |
| 2010/0296473 A1 | 11/2010 | Kim et al. | | |
| 2011/0085513 A1 | 4/2011 | Chen et al. | | |
| 2011/0096745 A1 | 4/2011 | Ahn et al. | | |
| 2011/0141998 A1 | 6/2011 | Nashio et al. | | |
| 2011/0170496 A1 | 7/2011 | Fong et al. | | |
| 2011/0194525 A1 | 8/2011 | Nishio et al. | | |
| 2011/0223926 A1 | 9/2011 | Nakao et al. | | |
| 2011/0249633 A1 | 10/2011 | Hong et al. | | |
| 2013/0016692 A1 * | 1/2013 | Chen et al. | ..................... | 370/330 |

(Continued)

FOREIGN PATENT DOCUMENTS

| | | | | |
|---|---|---|---|---|
| EP | 2549820 | 1/2013 | ............ | H04W 72/12 |
| EP | 2566234 | 3/2013 | ............ | H04W 28/18 |
| WO | WO 2011/127435 | 10/2011 | ............ | H04W 72/08 |

OTHER PUBLICATIONS

U.S. Appl. No. 13/618,197, filed Sep. 14, 2012, Chenxi Zhu.

(Continued)

*Primary Examiner* — Min Jung
(74) *Attorney, Agent, or Firm* — Baker Botts L.L.P.

(57) ABSTRACT

According to one embodiment, a method includes scheduling at least one time and at least one set of subcarrier frequencies to be used to transmit each of a plurality of data signals. Control signals may be addressed to at least one endpoint and may indicate at least one time and at least one set of subcarrier frequencies to be used to transmit one or more of the data signals to the at least one endpoint. For each control signal, at least one time and at least one set of frequencies selected from the frequency range to be used to transmit the control signal may be scheduled. At least one of the plurality of control signals and at least one of the plurality of data signals are scheduled to be transmitted simultaneously by the transceiver. The data signals and the control signals are transmitted to the plurality of endpoints.

18 Claims, 6 Drawing Sheets

(56) References Cited

U.S. PATENT DOCUMENTS

2013/0064119 A1* 3/2013 Montojo et al. .............. 370/252
2014/0029568 A1* 1/2014 Wang et al. ................... 370/330

OTHER PUBLICATIONS

3GPP TS 36.211 V 10.4.0; 3rd Generation Partnership Project; Technical Specification Group Radio Access Network; Evolved Universal Terrestrial Radio Access (E-UTRA); Physical Channels and Modulation (Release 10); 101 pages, Dec. 2011.

3GPP TS 36.212 V 10.4.0; 3rd Generation Partnership Project; Technical Specification Group Radio Access Network; Evolved Universal Terrestrial Radio Access (E-UTRA); Multiplexing and Channel Coding (Release 10); 78 pages, Dec. 2011.

3GPP TS 36.213 V 10.4.0; 3rd Generation Partnership Project; Technical Specification Group Radio Access Network; Evolved Universal Terrestrial Radio Access (E-UTRA); Physical Layer Procedures (Release 10); 125 pages, Dec. 2011.

International Search Report and Written Opinion; PCT/US2013/023712; pp. 15, Apr. 3, 2013.

International Search Report and Written Opinion; PCT/US2013/023710; pp. 16, Apr. 3, 2013.

* cited by examiner

ENHANCED CONTROL SIGNALS MULTIPLEXED WITH DATA SIGNALS

CROSS-REFERENCE TO RELATED APPLICATION

This application claims the benefit of priority under 35 U.S.C. §119(e) of U.S. Provisional Application Ser. No. 61/593,705, entitled "IMPROVEMENTS TO DOWNLINK CONTROL CHANNEL IN LTE-A AND ENDPOINT POWER USAGE," filed Feb. 1, 2012, the entire content of which is incorporated herein by reference.

TECHNICAL FIELD OF THE INVENTION

The present disclosure relates generally to methods and apparatuses for enhanced control signals multiplexed with data signals.

BACKGROUND OF THE INVENTION

An antenna system may include multiple transceivers such as transmission sites or endpoints. A transmission site may be a base station (also known as a Radio Element Control or a Baseband Unit) or a remote transmission site (also known as a Radio Element or a Remote Radio Head). Transmission sites provide endpoints with wireless network access. A transmission site may transmit control signals, data signals, and other signals to the endpoints. The control signals may facilitate the processing of the data signals by the endpoints.

SUMMARY OF THE INVENTION

Various embodiments of the present disclosure relate to enhanced control signals multiplexed with data signals. For example, in one embodiment, a method includes scheduling, for each data signal of a plurality of data signals, at least one time and at least one set of subcarrier frequencies selected from a frequency range to be used to transmit the data signal. The method further includes generating a plurality of control signals. Each control signal may be addressed to at least one endpoint of a plurality of endpoints and may indicate the scheduled at least one time and at least one set of subcarrier frequencies to be used to transmit one or more of the plurality of data signals to the at least one endpoint of the plurality of endpoints. The method further includes scheduling, for each control signal of the plurality of control signals, at least one time and at least one set of frequencies selected from the frequency range to be used to transmit the control signal. At least one of the plurality of control signals and at least one of the plurality of data signals are scheduled to be transmitted simultaneously by the transceiver. The plurality of data signals and the plurality of control signals are transmitted to the plurality of endpoints.

The object and advantages of the invention will be realized and achieved by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

For a more complete understanding of particular embodiments and their features and advantages, reference is now made to the following description, taken in conjunction with the accompanying drawings, in which.

DETAILED DESCRIPTION OF THE INVENTION

Figure 1:
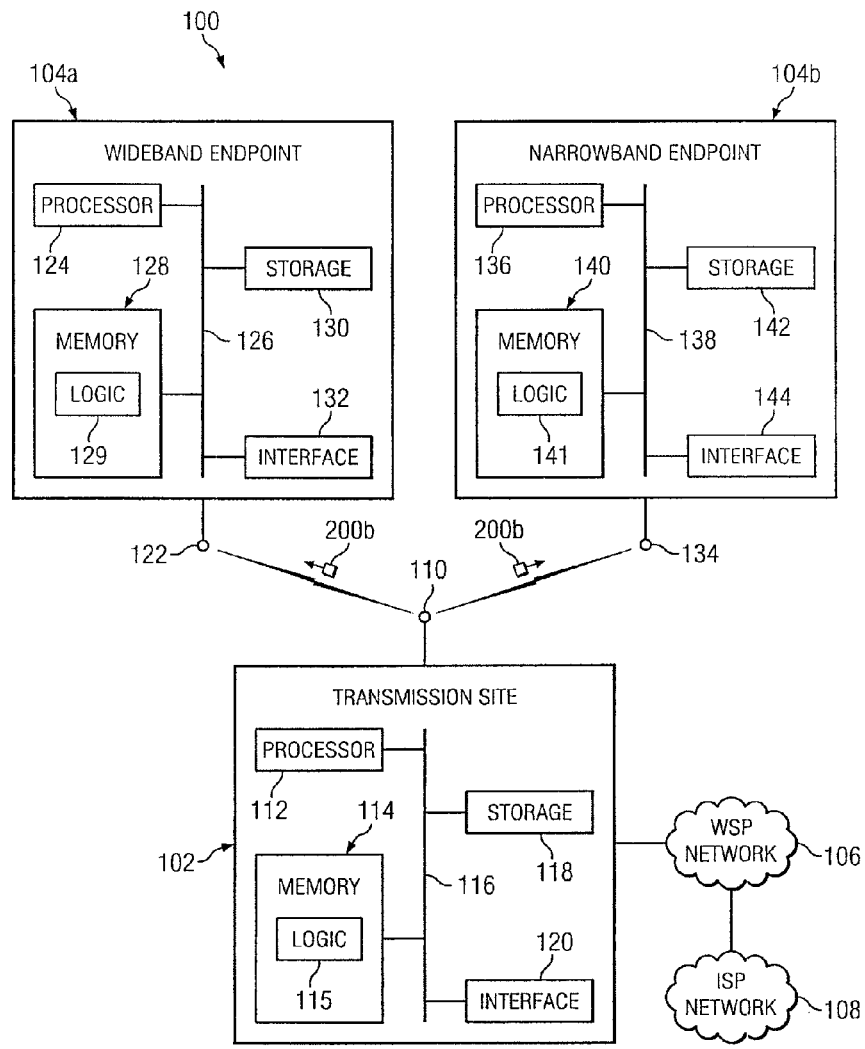
FIG. 1 depicts an example system that includes an example transmission site that communicates with an example wideband endpoint and an example narrowband endpoint.

FIG. 1 depicts an example system 100 that includes transmission site 102 that communicates with a wideband endpoint 104a and a narrowband endpoint 104b. System 100 may include any suitable number of transmission sites 102 and endpoints 104 that communicate with each other. System 100 may provide wireless coverage for any suitable number of endpoints 104 over a geographic area, such as a cell. For example, transmission site 102 may be used to provide wireless coverage for an entire building, a city block, a campus, or any other area. Transmission site 102 may be coupled to one or more networks, such as wireless service provider (WSP) network 106 or internet service provider (ISP) network 108. Transmission site 102 may communicate data between endpoints 104 and one or more nodes coupled to WSP network 106 or ISP network 108.

In particular embodiments, transmission site 102 is capable of communicating with both wideband endpoints (such as 104a) and narrowband endpoints (such as 104b). A wideband endpoint 104a is an endpoint that is configured to decode signals transmitted using any subcarrier frequencies within the frequency range (i.e., channel bandwidth) of wireless transmissions (e.g., 200b) by transmission site 102 to endpoints 104. As an example, if transmission site 102 transmits control signals, data signals, and other signals to endpoints 104 using a Long Term Evolution (LTE) or LTE-Advanced (LTE-A) standard (such as that described in 3rd Generation Partnership Project (3GPP) Release 10 or beyond), the frequency range may be 1.4 MHz, 3 MHz, 5 MHz, 10 MHz, 15 MHz, or 20 MHz. Each frequency range may include a plurality of contiguous subcarrier frequencies that are equally spaced apart to reduce or eliminate interference between signals transmitted using neighboring subcarrier frequencies. For example, in LTE or LTE-A, contiguous subcarrier frequencies are spaced 15 kHz apart from each other. In contrast to a wideband endpoint 104a, a narrowband endpoint 104b is configured to decode signals transmitted using subcarrier frequencies that are within a portion of the frequency range (referred to herein as the "narrowband"). Thus, narrowband endpoint 104b is only configured to decode signals transmitted using a subset of the subcarrier frequencies (i.e., the narrowband) of the frequency range, but is not configured to decode signals transmitted using subcarrier frequencies outside of this subset. Transmission site 102 may communicate with narrowband endpoints 104b by limiting the subcarrier frequencies that carry signals for the narrowband endpoints 104b to the narrowband.

Narrowband endpoints 104b and methods used to wirelessly communicate with them have various advantages over previous communication schemes. During communication, a narrowband endpoint 104b may perform computations that are less complex than computations performed by a wideband endpoint 104a. For example, a narrowband endpoint 104b may perform smaller size Discrete Fourier Transforms (DFTs) and use an analog to digital converter (ADC) with a lower sampling rate when recovering the signals transmitted to the endpoint. The reduction in computation complexity required may result in a lower construction cost of a narrowband endpoint 104b relative to a wideband endpoint 104a. For example, low cost endpoints such as machine type communication (MTC) devices or sensor nodes may function as narrowband endpoints. The lower computation complexity also allows narrowband endpoint 104b to use less power. In various embodiments, this may greatly increase the battery cycle of a device. For example, an endpoint 104b may periodically awake from an idle or dormant state to determine whether a transmission site 102 is currently transmitting data to the device. By only decoding in the narrowband, the endpoint may realize power savings each time it wakes up and checks for data. In particular embodiments, a narrowband endpoint 104b may transition to operation as a wideband endpoint 104a upon a determination that transmission site 102 has begun to transmit data signals to the narrowband endpoint 104b. This may allow the endpoint 104 to receive data at a higher rate than is possible during narrowband operation. Operation of the transmission site 102 and narrowband endpoint 104b are explained in greater detail below.

Transmission site 102 may be any suitable transceiver such as a base station (also known as a Radio Element Control or a Baseband Unit) or a remote transmission site (also known as a Radio Element or a Remote Radio Head (RRH)). In certain situations, a transmission site 102 that is a remote transmission site may function as an extension of another transmission site that is a base station. For example, the remote transmission site may send wireless signals to endpoints 104 that are similar to wireless signals that would be sent by the base station to the endpoint if endpoint 104 were located close to the base station.

Transmission site 102 may include any combination of hardware, software embedded in a computer readable medium, or encoded logic incorporated in hardware or otherwise stored (e.g., firmware) to implement any number of communication protocols that allow for wired or wireless exchange of information in system 100. Transmission site 102 may be operable to exchange control signals, data signals, and other signals with endpoints 104. A transmission site 102 may also be coupled to other transmission sites 102 via one or more wired connections. These wired connections may comprise any suitable material, such as optical fiber. Transmission sites 102 may use any suitable technologies or protocols (e.g., Common Public Radio Interface (CPRI)) to communicate with each other.

Transmission site 102 may communicate with endpoint 104 using wireless communication via one or more antennas 110. In particular embodiments, transmission site 102 coordinates with one or more other transmission sites 102 to communicate with endpoint 104. For example, transmission site 102 may coordinate with one or more other transmission sites 102 to communicate with endpoint 104 using a MIMO transmission scheme where multiple transmitting antennas 110 are placed at different transmission sites 102, while one or more receiving antennas (e.g., antenna 122) are located at the endpoint 104. Accordingly, reference herein to a single transmission site communicating with one or more endpoints 104 may also refer to multiple transmission sites 102 jointly communicating with the one or more endpoints 104. Transmission site 102 may communicate with endpoints 104 using any of a variety of different wireless technologies, including, but not limited to, orthogonal frequency division multiple access (OFDMA) and the LTE-A protocol as defined in the 3GPP Release 10 or beyond.

Antennas 110, 122, and 134 may be any suitable type of antennas capable of transmitting and receiving data or signals wirelessly. In some embodiments, antennas 110, 122, or 134 may comprise one or more omni-directional, sector or panel antennas operable to transmit/receive radio signals at any suitable frequency, such as between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

System 100 may comprise a network that includes various networks, such as ISP network 108 and WSP network 106. In some embodiments, a network may comprise one or more networks, such as the Internet, a local area network (LAN), a wide area network (WAN), a metropolitan area network (MAN), a public switched telephone network (PSTN), or some combination of the above. In certain embodiments, ISP network 108 may be coupled to WSP network 106 via one or more networks, including but not limited to, the Internet, a LAN, WAN, MAN, PSTN, or some combination of the above. In some embodiments, an ISP may provide a network node (e.g., a computer system) with home network access. ISP network 108 may include modems, servers, gateways (e.g., an ISP gateway), or other suitable components.

In particular embodiments, WSP network 106 may comprise various servers, gateways, switches, routers, and other nodes used in providing wireless service. In some embodiments, the servers may comprise one or more servers, such as Operation, Administration, Maintenance and Provisioning (OAM&P) servers, Network Access Provider (NAP) servers, Authentication, Authorization, and Accounting (AAA) servers, Self Organizing Network (SON) servers, or any other servers that the WSP may need to configure/authenticate one or more transmission sites (such as 102) and provide users with wireless service. The WSP's gateways may comprise any hardware or software needed to couple WSP network 106 with ISP network 108. For example, in particular embodiments, the gateway may comprise a security gateway and, behind the security gateway, an Access Service Network (ASN) gateway. In some embodiments, the WSP network 106 may support or implement orthogonal frequency-division multiple access (OFDMA).

Any of the networks coupled to transmission site 102 may be capable of transmitting signals, data, or messages, including signals, data, or messages transmitted through WebPages, e-mail, text chat, voice over IP (VoIP), and instant messaging in order to provide services and data to endpoints 104. In particular embodiments, transmission site 102 also communicates with a base station controller that facilitates handoffs between cells and provides other functions.

Endpoint 104 may comprise any type of wireless device able to send and receive data or signals to and from transmission site 102 directly or via one or more other transmission sites 102. Some examples of endpoints 104 include desktop computers, PDAs, cell phones, laptops, VoIP phones, MTC devices, or sensor nodes. Endpoints 104 may provide data or network services to a user through any combination of hardware, software embedded in a computer readable medium, or encoded logic incorporated in hardware or otherwise stored (e.g., firmware). Endpoints 104 may also include unattended or automated systems, gateways, other intermediate components or other devices that may send or receive data or signals.

Transmission site 102, endpoints 104, and nodes of WSP network 106 or ISP network 108 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of a transmission site 102 or endpoints 104 may comprise any suitable physical form, configuration, number, type or layout. As an example, and not by way of limitation, transmission site 102 or endpoint 104 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, transmission site 102 or endpoint 104 may include one or more computer systems; be unitary or distributed; span multiple locations; span multiple machines; or reside in a cloud, which may include one or more cloud components in one or more networks.

In the depicted embodiment, transmission site 102 or endpoints 104 each include their own respective processors 112, 124, and 136; memory 114, 128, and 140; storage 118, 130, and 142; interfaces 120, 132, and 144; and buses 116, 126, and 138. Although a particular system is depicted having a particular number of particular components in a particular arrangement, this disclosure contemplates any suitable system 100 having any suitable number of any suitable components in any suitable arrangement. For simplicity, similar components of transmission site 102 and endpoints 104 will be discussed together while referring to the component of transmission site 102. However, it is not necessary for these devices to have the same components, or the same type of components. For example, processor 112 may be a general purpose microprocessor and processor 124 may be an application specific integrated circuit (ASIC).

Processor 112 may be a microprocessor, controller, or any other suitable computing device, resource, or combination of hardware, software or encoded logic operable to provide, either alone or in conjunction with other components, (e.g., memory 114) wireless networking functionality. Such functionality may include providing various wireless features discussed herein. Additional examples and functionality provided, at least in part, by processor 112 will be discussed below.

In particular embodiments, processor 112 may include hardware for executing instructions, such as those making up a computer program. As an example and not by way of limitation, to execute instructions, processor 112 may retrieve (or fetch) instructions from an internal register, an internal cache, memory 114, or storage 118; decode and execute them; and then write one or more results to an internal register, an internal cache, memory 114, or storage 118.

In particular embodiments, processor 112 may include one or more internal caches for data, instructions, or addresses. This disclosure contemplates processor 112 including any suitable number of any suitable internal caches, where appropriate. As an example and not by way of limitation, processor 112 may include one or more instruction caches, one or more data caches, and one or more translation lookaside buffers (TLBs). Instructions in the instruction caches may be copies of instructions in memory 114 or storage 118 and the instruction caches may speed up retrieval of those instructions by processor 112. Data in the data caches may be copies of data in memory 114 or storage 118 for instructions executing at processor 112 to operate on; the results of previous instructions executed at processor 112 for access by subsequent instructions executing at processor 112, or for writing to memory 114, or storage 118; or other suitable data. The data caches may speed up read or write operations by processor 112. The TLBs may speed up virtual-address translations for processor 112. In particular embodiments, processor 112 may include one or more internal registers for data, instructions, or addresses. Depending on the embodiment, processor 112 may include any suitable number of any suitable internal registers, where appropriate. Where appropriate, processor 112 may include one or more arithmetic logic units (ALUs); be a multi-core processor; include one or more processors 112; or any other suitable processor.

Memory 114 may be any form of volatile or non-volatile memory including, without limitation, magnetic media, optical media, random access memory (RAM), read-only memory (ROM), flash memory, removable media, or any other suitable local or remote memory component or components. In particular embodiments, memory 114 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 114 may include one or more memories 114, where appropriate. Memory 114 may store any suitable data or information utilized by transmission site 102. For example, memory 114 may include logic 115. Logic 115 may include software embedded in a computer readable medium, or encoded logic incorporated in hardware or otherwise stored (e.g., firmware). In particular embodiments, logic 115 may be executed to perform the functions of transmission site 102. Similarly, logic 129 and 141 may be executed to perform the functions of wideband endpoint 104a and narrowband endpoint 104b respectively. In particular embodiments, memory 114 may include main memory for storing instructions for processor 112 to execute or data for processor 112 to operate on. In particular embodiments, one or more memory management units (MMUs) may reside between processor 112 and memory 114 and facilitate accesses to memory 114 requested by processor 112.

As an example and not by way of limitation, transmission site 102 may load instructions from storage 118 or another source (such as, for example, another computer system, another base station, or a remote transmission site) to memory 114. Processor 112 may then load the instructions from memory 114 to an internal register or internal cache. To execute the instructions, processor 112 may retrieve the instructions from the internal register or internal cache and decode them. During or after execution of the instructions, processor 112 may write one or more results (which may be intermediate or final results) to the internal register or internal cache. Processor 112 may then write one or more of those results to memory 114. In particular embodiments, processor 112 may execute only instructions in one or more internal registers or internal caches or in memory 114 (as opposed to storage 118 or elsewhere) and may operate only on data in one or more internal registers or internal caches or in memory 114 (as opposed to storage 118 or elsewhere).

In particular embodiments, storage 118 may include mass storage for data or instructions. As an example and not by way of limitation, storage 118 may include a hard disk drive (HDD), a floppy disk drive, flash memory, an optical disc, a magneto-optical disc, magnetic tape, or a Universal Serial Bus (USB) drive or a combination of two or more of these. Storage 118 may include removable or non-removable (or fixed) media, where appropriate. Storage 118 may be internal or external to transmission site 102, where appropriate. In particular embodiments, storage 118 may be non-volatile, solid-state memory. In particular embodiments, storage 118 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 118 may take any suitable physical form and may comprise any suitable number or type of storage. Storage 118 may include one or more storage control units facilitating communication between processor 112 and storage 118, where appropriate.

In particular embodiments, interface 120 may include hardware, encoded software, or both providing one or more interfaces for communication (such as, for example, packet-based communication) between transmission sites 102, endpoints 104, any networks, any network devices, or any other computer systems. As an example and not by way of limitation, communication interface 120 may include a network interface controller (NIC) or network adapter for communicating with an Ethernet or other wire-based network or a wireless NIC (WNIC) or wireless adapter for communicating with a wireless network.

In some embodiments, interface 120 comprises one or more radios coupled to one or more antenna ports 110. In such an embodiment, interface 120 receives digital data that is to be sent out to wireless devices, such as endpoints 104, via a wireless connection. The radio may convert the digital data into a radio signal having the appropriate center frequency, bandwidth parameters, and transmission power. Similarly, the radios may convert radio signals received via one or more receiving antennas into digital data to be processed by, for example, processor 112.

Depending on the embodiment, interface 120 may be any type of interface suitable for any type of network for which system 100 is used. As an example and not by way of limitation, system 100 may communicate with an ad-hoc network, a personal area network (PAN), a LAN, a WAN, a MAN, or one or more portions of the Internet or a combination of two or more of these. One or more portions of one or more of these networks may be wired or wireless. As an example, system 100 may communicate with a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. Transmission site 102 may include any suitable interface 120 for any one or more of these networks, where appropriate.

In some embodiments, interface 120 may include one or more interfaces for one or more I/O devices. One or more of these I/O devices may enable communication between a person and transmission site 102. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type or number of I/O devices and any suitable type or number of interfaces 120 for them. Where appropriate, interface 120 may include one or more drivers enabling processor 112 to drive one or more of these I/O devices. Interface 120 may include one or more interfaces 120, where appropriate.

Bus 116 may include any combination of hardware, software embedded in a computer readable medium, or encoded logic incorporated in hardware or otherwise stored (e.g., firmware) to couple components of transmission site 102 to each other. As an example and not by way of limitation, bus 116 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 116 may include any number, type, or configuration of buses 116, where appropriate. In particular embodiments, one or more buses 116 (which may each include an address bus and a data bus) may couple processor 112 to memory 114. Bus 116 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 112 (such as, for example, one or more internal registers or caches), one or more portions of memory 114, one or more portions of storage 118, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Although FIG. 1 has been described above as including particular components, the system of FIG. 1 may include any combination of any of the described components and any of the options or features described herein, as would be understood by one of ordinary skill in the art. For example, any of the options or features described herein may be utilized in combination with the illustrated embodiments of FIG. 1 or any number of the other options or features also described herein as would be understood by one of ordinary skill in the art.

While various implementations and features are discussed with respect to multiple embodiments, it should be understood that such implementations and features may be combined in various embodiments. For example, features and functionality discussed with respect to a particular figure, such as FIG. 1, may be used in connection with features and functionality discussed with respect to another such figure, such as FIG. 2, 3, 4 or 5, according to operational needs or desires.

Figure 2A:
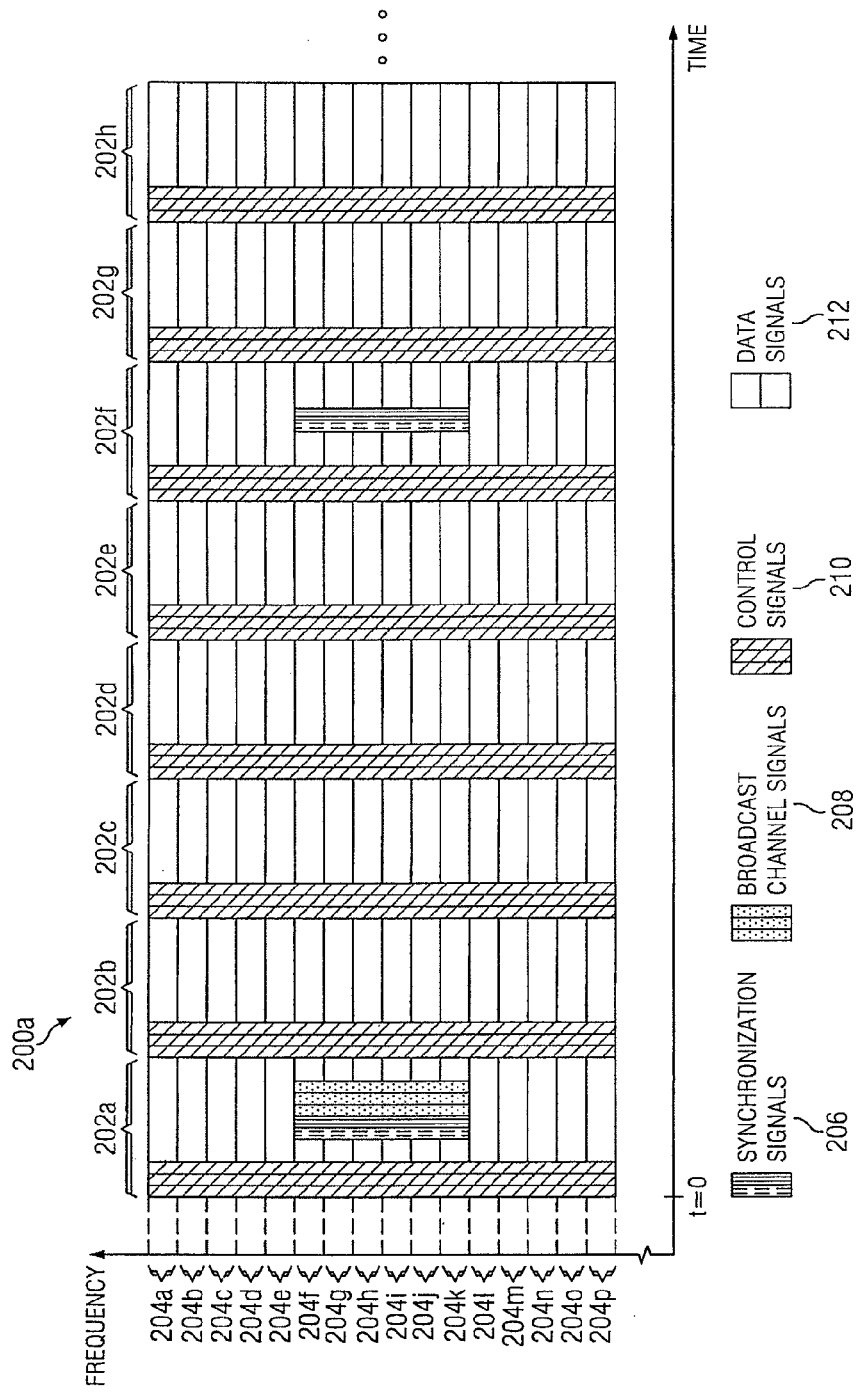
FIGS. 2A and 2B depicts example communication diagrams that represent signals transmitted by the transmission site of FIG. 1.
Figure 2B:
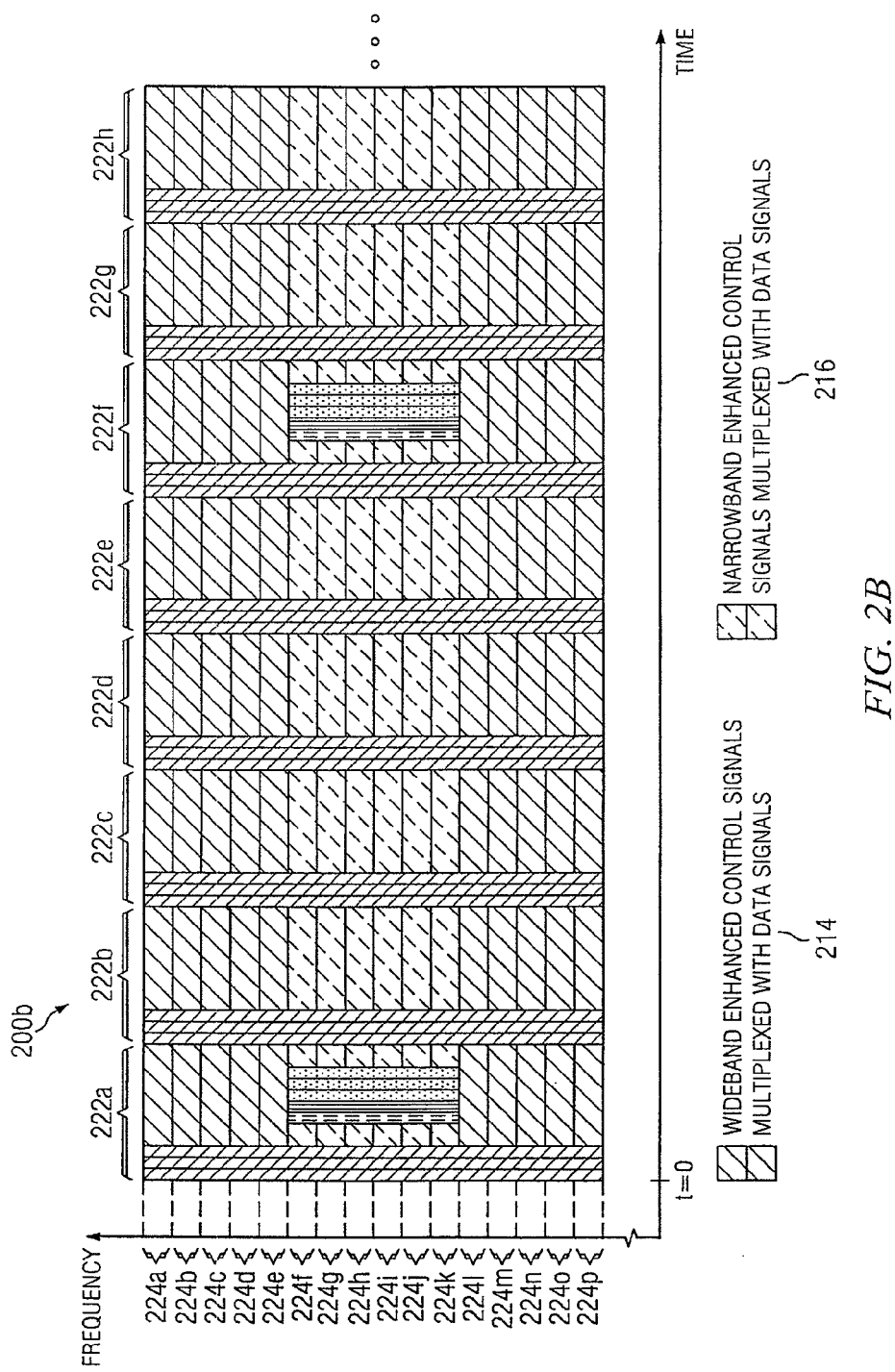

FIGS. 2A and 2B depict example communication diagrams that illustrate communications 200 used by transmission site 102 to transmit information to one or more wideband endpoints 104a and one or more narrowband endpoints 104b. The diagram of FIG. 2A depicts communication 200a used to transmit information to wideband endpoints 104a while the diagram of FIG. 2B depicts communication 200b used to transmit information to wideband endpoints 104a and narrowband endpoints 104b. The horizontal axis of each diagram is time and the vertical axis is frequency.

Communication 200a is divided into units of time (subframes 202) and frequency sets 204, that each include one or more subcarrier frequencies. In the embodiment depicted, each subframe 202 represents the amount of time required to transmit twelve symbols (e.g., 1 ms in an LTE-A transmission scheme) and each frequency set 204a represents twelve contiguous subcarrier frequencies. The subcarrier frequencies may be equally spaced apart to reduce or eliminate interference between signals transmitted using neighboring subcarrier frequencies. By way of example, a set of contiguous subcarrier frequencies may include 3.000060 GHz, 3.000075 GHz, 3.000090 GHz, 3.000105 GHz, and so on. The aggregation of frequency sets 204 represents the frequency range of the communication 200a. That is, the frequency range spans from the lowest frequency of set 204a to the highest frequency of set 204p and includes each subcarrier frequency in between these two frequencies.

In particular implementations, a set 204 of contiguous subcarrier frequencies used to transmit one or more signals for a particular amount of time may form a block. A block may include any suitable number of subcarrier frequencies and any suitable number of data symbols. For example, in an LTE-A communication scheme, twelve contiguous subcarrier frequencies each transmitting six or seven data symbols in a given amount of time (e.g., 0.5 ms) form a physical resource block (PRB). Accordingly, the area of communication 200a bounded by subframe 202a and frequency set 204a may represent two PRBs.

A data symbol is a complex number with real or imaginary components that map a group of bits to one or more modulation characteristics of a carrier wave transmitted at a particular subcarrier frequency. Groups of bits of data signals, control signals, or other signals to be transmitted may be encoded into data symbols associated with the signals. The data symbols may be transmitted (generally after one or more processing steps) to one or more endpoints 104 via carrier waves with modulated characteristics defined by the data symbols (or the data symbols that result from the processing of the original data symbols). As an example, a data symbol may define a phase modulation or an amplitude modulation of a carrier wave. The modulation characteristics defined by the data symbol are determined by the bits of the data signals, control signals, or other signals. Particular embodiments may use quadrature phase-shift keying (QPSK), quadrature amplitude modulation (QAM)16, or QAM64 modulation to generate data symbols from the bits of the signals.

Various types of information may be sent between transmission site 102 and endpoints 104. Examples of information types include data signals 212, control signals 210, and other signals. Data signals 212 are carried over a connection between a transmission site 102 and an endpoint 104. For example and not by way of limitation, data signals 212 may include information that transmission site 102 receives from a network coupled to the transmission site 102 (such as WSP network 106 or ISP network 108) or from another endpoint 104 located in the same cell or a different cell. In a particular embodiment, data signals 212 are sent from a transmission site 102 to an endpoint 104 via a physical downlink shared channel (PDSCH) as defined in the LTE-A protocol.

Control signals 210 and other signals (such as synchronization signals 206 and broadcast channel signals 208) sent from a transmission site 102 to an endpoint 104 may be used to setup and maintain a connection between the transmission site 102 and the endpoint 104. Control signals 210 may also include information (e.g., scheduling or demodulation information) that allows endpoint 104 to recover data signals 112 sent to the endpoint 104. In particular embodiments, at least some of the control signals 210 and other signals may conform to the LTE-A standard. For example, in the embodiment depicted, synchronization signals 206 may include primary synchronization signals (PSS) and secondary synchronization signals (SSS), broadcast channel signals 208 may include physical broadcast channel (PBCH) signals, and control signals 210 may include physical control format indicator channel (PCFICH) signals and physical downlink control channel (PDCCH) signals.

Synchronization signals 206 may include one or more sequences that are known to endpoints 104. In the embodiment depicted, synchronization signals 206 are transmitted in the first subframe 202a and the sixth subframe 202f. In particular embodiments, the transmission of synchronization signals 206 may be repeated periodically (e.g., twice every ten subframes). When an endpoint 104 begins receiving signals from transmission site 102 (e.g., upon powering on or entering a range of the transmission site 102), the endpoint may search for synchronization signals 206 to determine a reference point in order to synchronize to the communication from the transmission site 102. In particular embodiments, the synchronization signals 206 are transmitted using only a portion of the frequency range of the communication. For example, the synchronization signals 206 may be transmitted using subcarrier frequencies located in the narrowband. In the embodiment depicted, synchronization signals 206 are transmitted using frequency sets 204*f*-204*k*.

Broadcast channel signals 208 may also be transmitted periodically using subcarrier frequencies located in the narrowband. In the embodiment depicted, broadcast channel signals 208 are transmitted using the same subcarrier frequencies as the synchronization signals 206. The broadcast channel signals 208 may include configuration information of transmission site 102 and may indicate how particular signals from transmission site 102 should be decoded. Broadcast channel signals 208 may include information that is common to all endpoints, such as the frequency range used by the transmission site 102.

Control signals 210 facilitate decoding of data signals 212. Control signals 210 may indicate which blocks of a communication (e.g., a subframe 202) from transmission site 102 include data signals 212 transmitted to each endpoint 104. For example, the control signals 210 transmitted in a particular subframe 202*a* may indicate particular blocks of the subframe 202*a* that include data signals for a particular endpoint 104. Control signals 210 may also indicate a modulation and code rate of any of the blocks that include data signals 212. Control signals 210 may also include information regarding a transmission scheme used by transmission site 102, such as spatial multiplex, transmission diversity, open loop MIMO, or closed loop MIMO. A portion of control signals 210 may indicate the length (e.g., number of data symbols) of another portion of control signals 210. For example, in an LTE-A scheme, a PCFICH signal included in control signals 210 may indicate the length of a PDCCH signal included in control signals 210.

In the embodiment depicted, control signals 210 are transmitted in wideband. That is, control signals 210 are transmitted using subcarrier frequencies that span the entire frequency range of the communication. Accordingly, only a wideband endpoint 104*a* that is configured to sample the entire frequency range and decode signals transmitted using any subcarrier frequency of the frequency range may properly recover the control signals 210 and use the control signals 210 to recover the data signals 212 sent to the wideband endpoint 104*a*. Accordingly, the method of communication depicted in communication 200*a* is not compatible with narrowband endpoints 104*b*.

Communication 200*b* represents a type of communication that is compatible with both wideband endpoints 104*a* and narrowband endpoints 104*b*. Similar to communication 200*a*, communication 200*b* is divided into units of time (subframes 222) and frequency sets 224. Communication 200*b* may have any suitable characteristics of communication 200*a* described above.

Similar to communication 200*a*, communication 200*b* depicts the periodic transmission of synchronization signals 206 and broadcast channel signals 208 using subcarrier frequencies within the narrowband. In the embodiment depicted, the narrowband includes frequency sets 224*f*-224*k*. Communication 200*b* also includes wideband enhanced control signals multiplexed with data signals 214 and narrowband enhanced control signals multiplexed with data signals 216.

The enhanced control signals present in signals 214 and 216 may include any suitable information, such as that described above with respect to control signals 210. Communication methods utilizing these enhanced control signals may provide various advantages over communication schemes that are limited to transmission of control signals 210. For example, the enhanced control signals may allow transmission site 102 to communicate with a narrowband endpoint 104*b*. As other examples, the enhanced control signals may support increased control channel capacity and improved spatial reuse of control channel resources relative to communication schemes using only control signals 210. The enhanced control signals may also support frequency-domain inter-cell interference coordination (ICIC), beamforming, or diversity. In particular embodiments, the enhanced control signals present in signals 214 and 216 may implement one or more features of the enhanced PDCCH set forth in 3GPP LTE-A Release 11.

Signals 216 include narrowband enhanced control signals multiplexed with data signals using frequency division multiplexing. That is, at any particular time, some subcarrier frequencies within the narrowband may be transmitting enhanced control signals and some may be transmitting data signals. In particular embodiments, these signals are multiplexed according to blocks of two or more subcarrier frequencies. For example, the subcarrier frequencies of a particular block (such as a PRB) may each carry the same type of signal—either an enhanced control signal or a data signal. Signals 214 are multiplexed in a similar manner, but these signals are transmitted using subcarrier frequencies that are outside of the narrowband.

A control signal (such as a control signal 210 or an enhanced control signal) may be addressed to one or more particular endpoints 104 or it may be addressed to all of the endpoints 104 that transmission site 102 communicates with. A control signal may be addressed to one or more endpoints 104 in any suitable manner. In particular embodiments, a control signal may explicitly identify the one or more endpoints to which the control signal is addressed. A control signal may alternatively include a portion that is based on the particular endpoint or endpoints that the control signal is addressed to. For example, in a particular embodiment, cyclic redundancy check (CRC) data of the control signal may be determined based on an identifier of the destination endpoint. Accordingly, the endpoint 104 may detect that the control signal is addressed to the endpoint by analyzing the CRC data of the control signal in combination with the identifier of the endpoint 104. The identifier may be any suitable information, such as a physical address of the endpoint 104. In particular embodiments, a control signal may be implicitly addressed to one or more endpoints 104 by sending a message prior to the sending of the control signal that indicates the subcarrier frequencies and times that will be used to send the control signal. As another example, endpoints 104 may be preconfigured to expect a particular control signal that is sent to all endpoints 104 using a particular set of frequencies and times.

To facilitate the processing of control signals, one or more search spaces may be defined for the endpoints 104. A common search space is a group of subcarrier frequencies that are designated to transmit control signals that are common to all endpoints 104. An endpoint-specific search space is a group of subcarrier frequencies that are designated for the transmission of control signals to a particular endpoint 104. Accordingly, each endpoint 104 may locate control signals that are addressed to the endpoint 104 by searching the common search space and its own endpoint-specific search space. The search spaces may be identified by the endpoints 104 in any suitable manner. For example, the endpoints 104 may be preconfigured with one or more of the search spaces or the search spaces may be transmitted to the endpoints by transmission site 102. Because a common search space is broadcast in nature, transmission site 102 may communicate control signals using subcarrier frequencies in the common search space using space-frequency block coding (SFBC) or open-loop MIMO, while avoiding beamforming or closed loop MIMO.

The narrowband portion of the frequency range that includes the narrowband enhanced control signals multiplexed with data signals 216 may be located anywhere within the frequency range. Because a narrowband endpoint 104b should be able to sample and decode a frequency range that includes synchronization signals 206 and broadcast channel signals 208 to operate properly, in particular embodiments the narrowband includes the frequencies at which the synchronization signals 206 and broadcast channel signals 208 are transmitted. For example, in the embodiment depicted, the narrowband includes the frequencies within frequency sets 224f-224k. However, the narrowband portion may be widened to include additional frequencies or narrowed to include less frequencies. Although the narrowband is centered around the middle of the frequency range, the narrowband portion may be located anywhere within the frequency range. For example, the narrowband may include frequency sets 224a-224f, 224k-224p, or any other suitable combination of contiguous subcarrier frequencies.

Figure 3:
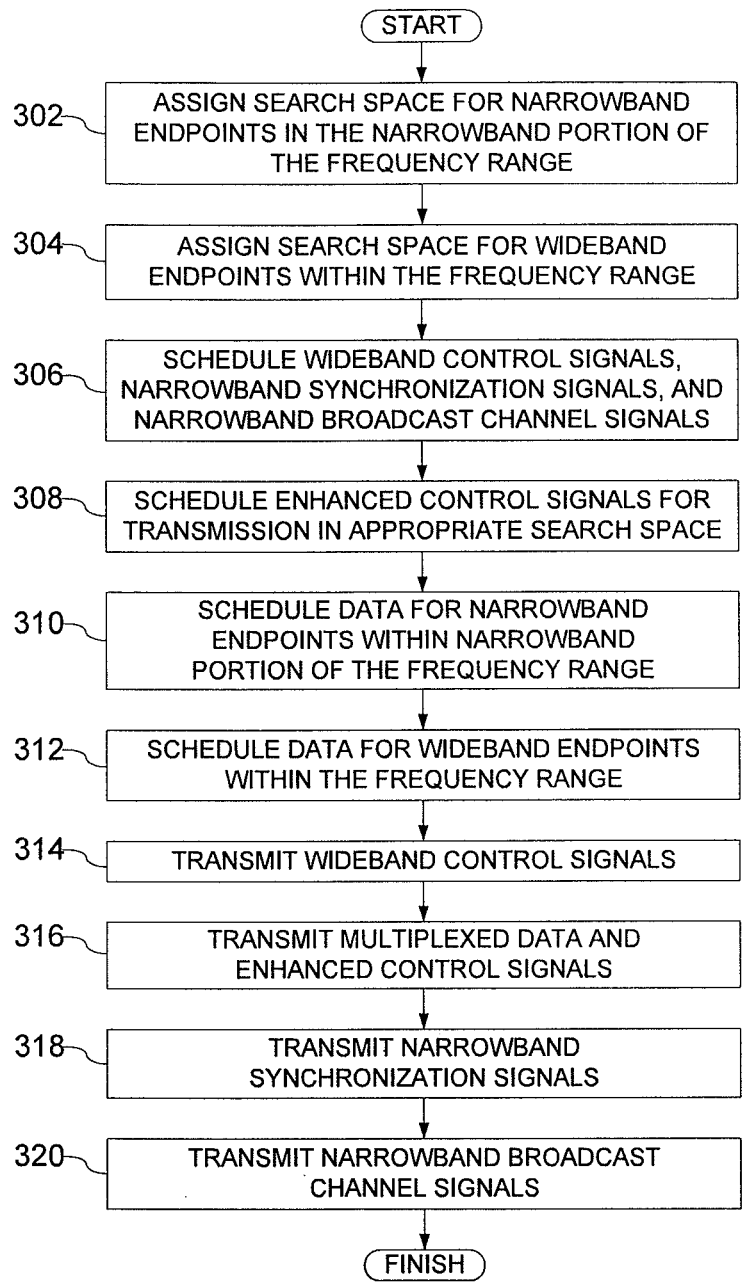
FIG. 3 depicts an example method for transmitting control signals, data signals, and other signals to wideband and narrowband endpoints that may be performed by the transmission site of FIG. 1.

FIG. 3 depicts an example method for transmitting control signals, data signals, and other signals to wideband endpoints 104a and narrowband endpoints 104b that may be performed by transmission site 102. For purposes of simplicity, the illustrated steps of the method of FIG. 3 are described from the perspective of a transmission site 102 though they could be performed by any suitable transceiver or multiple transceivers. The method begins at step 302, where at least one search space is assigned for the narrowband endpoints in the narrowband portion of the frequency range. For example, transmission site 102 may designate one or more subcarrier frequencies for transmission of control signals that are addressed to the narrowband endpoints 104b. These subcarrier frequencies are located within the narrowband. The search spaces may be endpoint-specific search spaces designated for control signals that are addressed to one or more particular narrowband endpoints 104b or common search spaces for control signals addressed to all of the endpoints 104b (assuming that the transmission site 102 communicates with at least one narrowband endpoint 104b). In particular embodiments, the search spaces applicable to a particular narrowband endpoint 104b (i.e., the subcarrier frequencies that will transmit control signals addressed to the narrowband endpoint 104b) may be communicated to the narrowband endpoint 104b by transmission site 102 before a communication 200b including data for the narrowband endpoint 104b is sent to narrowband endpoint 104b.

At step 304, at least one search space is assigned for the wideband endpoints within the frequency range. For example, transmission site 102 may designate one or more subcarrier frequencies for transmission of control signals that are addressed to the wideband endpoints 104a. These subcarrier frequencies may be located anywhere within the frequency range, including the narrowband if frequencies are available. These search spaces may be designated for control signals that are addressed to one or more particular wideband endpoints 104a (e.g., the search spaces may be endpoint-specific search spaces). In particular embodiments, the search space applicable to a particular wideband endpoint 104a (i.e., the subcarrier frequencies that will transmit control signals addressed to the wideband endpoint 104a) may be communicated to the wideband endpoint 104a by transmission site 102 before a communication 200b including data for the wideband endpoint 104a is sent to wideband endpoint 104a.

At step 306, wideband control signals, narrowband synchronization signals, and narrowband broadcast channel signals are scheduled. Scheduling a signal may include determining one or more subcarrier frequencies that will transmit the signal and one or more times at which the designated subcarrier frequencies will transmit the signal. As an example of step 302, transmission site 102 may schedule control signals 210, synchronization signals 206, and broadcast signals 208. A wideband control signal refers to a control signal that is transmitted using at least one subcarrier frequency located outside of the narrowband portion of the frequency range. A narrowband synchronization signal refers to a synchronization signal that is transmitted using subcarrier frequencies that are each inside of the narrowband. Similarly, a narrowband broadcast channel signal refers to a broadcast channel signal that is transmitted using subcarrier frequencies that are each inside of the narrowband.

At step 308, enhanced control signals are scheduled for transmission in appropriate search spaces. For example, in an enhanced control signal is addressed to all endpoints 104, it is placed in a common search space in the narrowband. As another example, if an enhanced control signal is addressed to one or more particular narrowband endpoints 104b, then the enhanced control signal is scheduled within the appropriate endpoint-specific search space(s) in the narrowband. As yet another example, if an enhanced control signal is addressed to one or more particular wideband endpoints 104a, then it may be placed within the appropriate endpoint-specific search space(s) in either the narrowband or the outside of the narrowband.

At step 310, data is scheduled for narrowband endpoints within the narrowband portion of the frequency range. As an example, transmission site 102 may schedule data signals for transmission to one or more narrowband endpoints 104b using blocks with subcarrier frequencies located within the narrowband that are not used for the transmission of other signals, such as synchronization signals 206, broadcast channel signals 208, or enhanced control signals. In particular embodiments, transmission site 102 may schedule data signals for transmission to one or more narrowband endpoints 104b using blocks with subcarrier frequencies located outside the narrowband if the narrowband endpoint 104b is capable of decoding these data signals using control signals transmitted using subcarrier frequencies in the narrowband as illustrated in further detail in FIG. 5.

At step 312, data is scheduled for wideband endpoints within the frequency range. As an example, transmission site 102 may schedule data signals for transmission to one or more wideband endpoints 104a using any available blocks that are not used for the transmission of other signals, such as synchronization signals 206, broadcast channel signals 208, or enhanced control signals.

At step 314, wideband control signals are transmitted. For example, transmission site 102 may transmit control signals 210 via subcarrier frequencies that span the entire frequency range. As depicted in communication diagram 200b, the control signals 210 are sent at the beginning of each subframe 222.

At step 316, multiplexed data and enhanced control signals are transmitted. For example, transmission site 102 may transmit wideband enhanced control signals multiplexed with data signals 214 and narrowband enhanced control signals multiplexed with data signals 216. The enhanced control signals and the data signals may be multiplexed using frequency division multiplexing. Accordingly, at any given time, particular subcarrier frequencies may transmit data signals while other subcarrier frequencies may transmit enhanced control signals. At a different point in time, a different set of subcarrier frequencies may transmit data signals while other subcarrier frequencies transmit enhanced control signals.

At step 318, narrowband synchronization signals are transmitted. For example, transmission site may transmit synchronization signals 206 using subcarrier frequencies within the narrowband. Simultaneously with this transmission, wideband enhanced control signals multiplexed with data signals 214 may be transmitted outside of the narrowband. In embodiments, where the narrowband includes subcarrier frequencies that are not utilized during transmission of synchronization signals 206, these subcarrier frequencies may be used to transmit narrowband enhanced control signals multiplexed with data signals 216 simultaneously with the transmission of synchronization signals 206.

At step 320, narrowband broadcast channel signals are transmitted and the method ends. For example, transmission site may transmit broadcast channel signals 208 using subcarrier frequencies within the narrowband. Simultaneously with this transmission, wideband enhanced control signals multiplexed with data signals 214 may be transmitted outside of the narrowband. In embodiments, where the narrowband includes subcarrier frequencies that are not utilized during transmission of broadcast channel signals 208, these subcarrier frequencies may be used to transmit narrowband enhanced control signals multiplexed with data signals 216 simultaneously with the transmission of broadcast channel signals 208.

Some of the steps illustrated in FIG. 3 may be combined, modified or deleted where appropriate, and additional steps may also be added to the flowchart. Any of the steps may be repeated. Additionally, steps may be performed in any suitable order without departing from the scope of particular embodiments. Moreover, two or more of the steps of the method may be performed simultaneously in particular embodiments. Although, the steps of FIG. 3 have been described with respect to a transmission site 102, they may be performed by any suitable transceiver.

Figure 4:
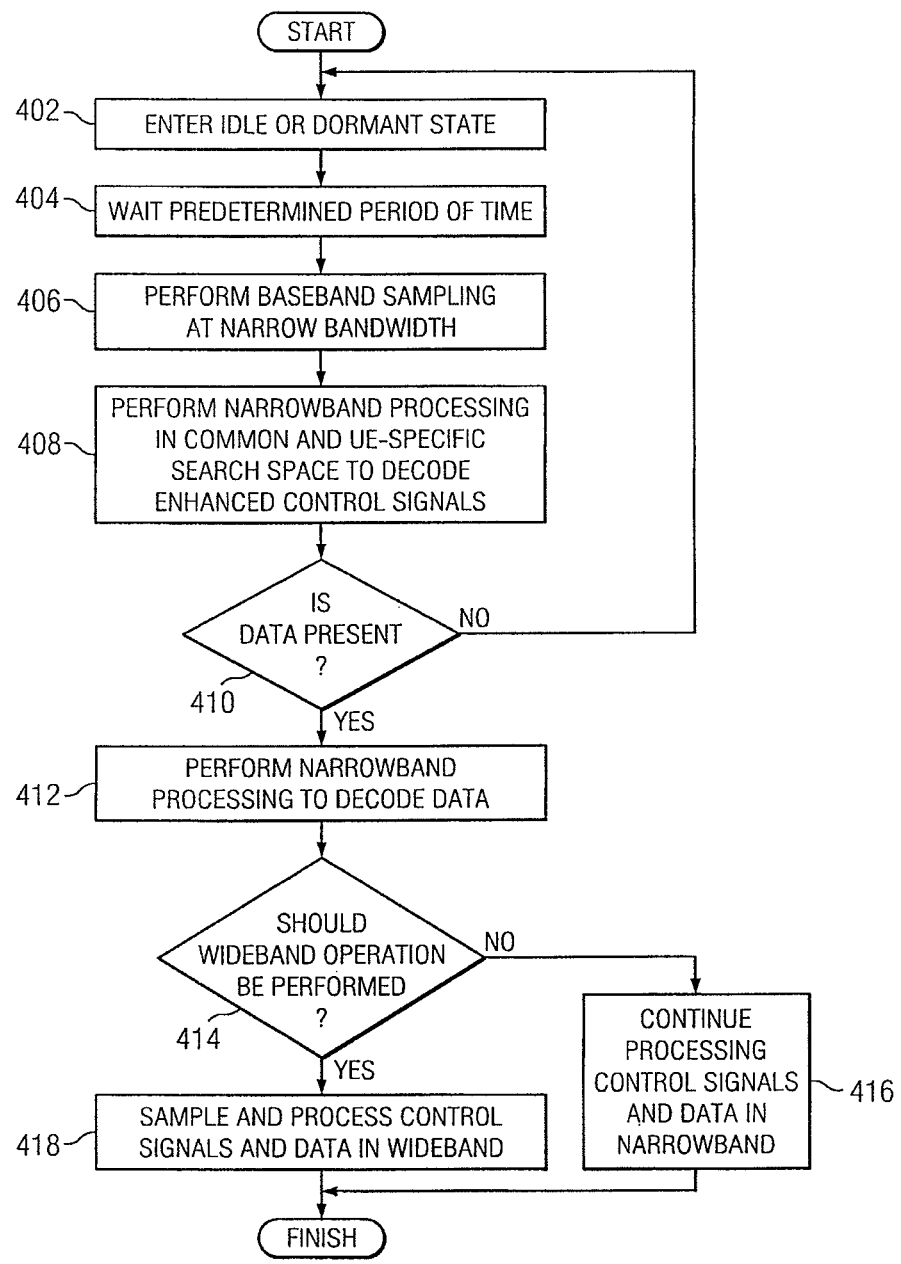
FIG. 4 depicts an example method for processing control signals and data signals that may be performed by the narrowband endpoint of FIG. 1.

FIG. 4 depicts an example method for processing control signals and data signals that may be performed by narrowband endpoint 104*b*. For purposes of simplicity, the illustrated steps of the method of FIG. 4 are described from the perspective of an endpoint 104 although they could be performed by any suitable transceiver. The method begins at step 402 in which narrowband endpoint 104*b* enters an idle or dormant state. When endpoint 104*b* is in an idle state, it does not transmit or receive data, and thus operates in a power conserving mode. The endpoint 104*b* may periodically wake up and analyze a communication from transmission site 102 to determine whether the communication includes a paging message for the endpoint 104*b* that indicates that data is to be transmitted to the endpoint. If a paging message is not present, the endpoint 104*b* may return to the idle state until it is scheduled to wake up and check again for a paging message. In the idle state, endpoint 104*b* may not have an active connection to a transmission site 102, so the endpoint 104*b* may need to perform a random access procedure to establish a connection with transmission site 102 before transmitting or receiving data signals. When endpoint 104*b* is in a dormant state, it does not transmit or receive data, and thus operates in a power conserving mode. However, a dormant endpoint 104*b* is connected to at least one transmission site 102 and wakes up more often than an idle endpoint. Upon waking up, the endpoint 104*b* may check to see if a communication from a transmission site 102 includes data signals for the endpoint 104*b*. If the communication does not, endpoint 104*b* will go back to a dormant state. If a dormant endpoint has not received data for a predetermined period of time, it may enter an idle state.

At step 404, the endpoint waits a predetermined period of time before waking up. As an example and not by way of limitation, a dormant endpoint may wait five seconds and an idle endpoint may wait two hundred milliseconds. At step 406, endpoint 104*b* wakes up and performs baseband sampling at the narrow bandwidth (i.e., in the narrowband). That is, endpoint 104*b* samples a transmission from transmission site 102 at a sufficient rate to recover the narrowband portion of the frequency range. The sampling rate of an ADC that samples at the narrowband may be lower than the sampling rate required that samples at the entire frequency range. The narrowband sampling also results in a reduction of the amount of memory required to store the samples.

At step 408, narrowband processing is performed in the common search space and the endpoint-specific search space associated with the endpoint 104*b* to decode enhanced control signals. Processing may include any suitable operations that facilitate decoding of the enhanced control signals. For example, processing may include filtering the sampled signals, performing discrete Fourier transforms (DFT) on the sampled signals, demodulation of the sampled signals, or other suitable processing. The processed signals are then analyzed to determine whether any of these signals include an enhanced control signal addressed to the endpoint 104*b*. In particular embodiments, this analysis may include checking a CRC value of an enhanced control signal in combination with a physical address of the endpoint 104*b* to determine whether the enhanced control signal is addressed to the endpoint 104. As other examples, this analysis may involve a determination that an enhanced control signal is a control signal addressed to all endpoints 104 because it was transmitted using a particular block or because it includes information indicating that it is addressed to all endpoints 104.

At step 410, the control signals addressed to the endpoint 104*b* are decoded and it is determined whether the communication from transmission site 102 includes data for endpoint 104*b*. For example, the communication may include at least a portion of a paging message or one or more data signals sent to the endpoint 104*b*. If there is no data present, endpoint 104*b* returns to an idle or dormant state at step 402. If data for the endpoint 104*b* is present, the endpoint performs narrowband processing to decode the data at step 412. That is, the endpoint may perform processing on information transmitted using subcarrier frequencies that are within the narrowband. The processing performed to decode the data signals may be similar to the processing performed to decode the enhanced control signals. In particular embodiments, the enhanced control signals may specify which blocks of the transmission include data signals for the endpoint 104*b*. The endpoint 104*b* may use this information to decode these blocks to recover the data signals.

At step 414, endpoint 104*b* determines whether wideband operation should be performed. That is, endpoint 104*b* determines whether it should change its configuration to operate as a wideband endpoint 104*a*. If endpoint 104*b* determines that it should not change its configuration, then it continues processing communications from transmission site 102 in a narrowband mode. That is, endpoint 104*b* will perform sampling at the narrowband portion and will only decode control signals transmitted via subcarrier frequencies located in the narrowband. If endpoint 104*b* determines that it should change its configuration, then the endpoint samples and processes future communications from transmission site 102 in a wideband mode at step 418. That is, endpoint 104 may perform sampling on the entire frequency range and may decode control signals transmitted via any of the subcarrier frequencies of the frequency range, including those outside of the narrowband. Such functionality allows endpoint 104 to conserve power by operating in a narrowband mode as it repeatedly wakes up from an idle or dormant state to check a communication for data and then to reconfigure to a wideband mode to receive data more quickly when data is being transmitted to the endpoint 104. If a narrowband endpoint 104b is only capable of operating in a narrowband mode, steps 414 and 418 may be omitted from the method. In particular embodiments, transmission site 102 may be operable to detect that a narrowband endpoint 104b is configured to switch to a wideband mode and thus only limits control signals and data signals to the narrowband portion on the first communication (e.g., subframe), while the control signals and data signals may be transmitted using any suitable subcarrier frequencies within the frequency range in subsequent communications.

Some of the steps illustrated in FIG. 4 may be combined, modified or deleted where appropriate, and additional steps may also be added to the flowchart. Any of the steps may be repeated. Additionally, steps may be performed in any suitable order without departing from the scope of particular embodiments. Moreover, two or more of the steps of the method may be performed simultaneously in particular embodiments. Although, the steps of FIG. 4 have been described with respect to an endpoint 104, they may be performed by any suitable transceiver.

Figure 5:
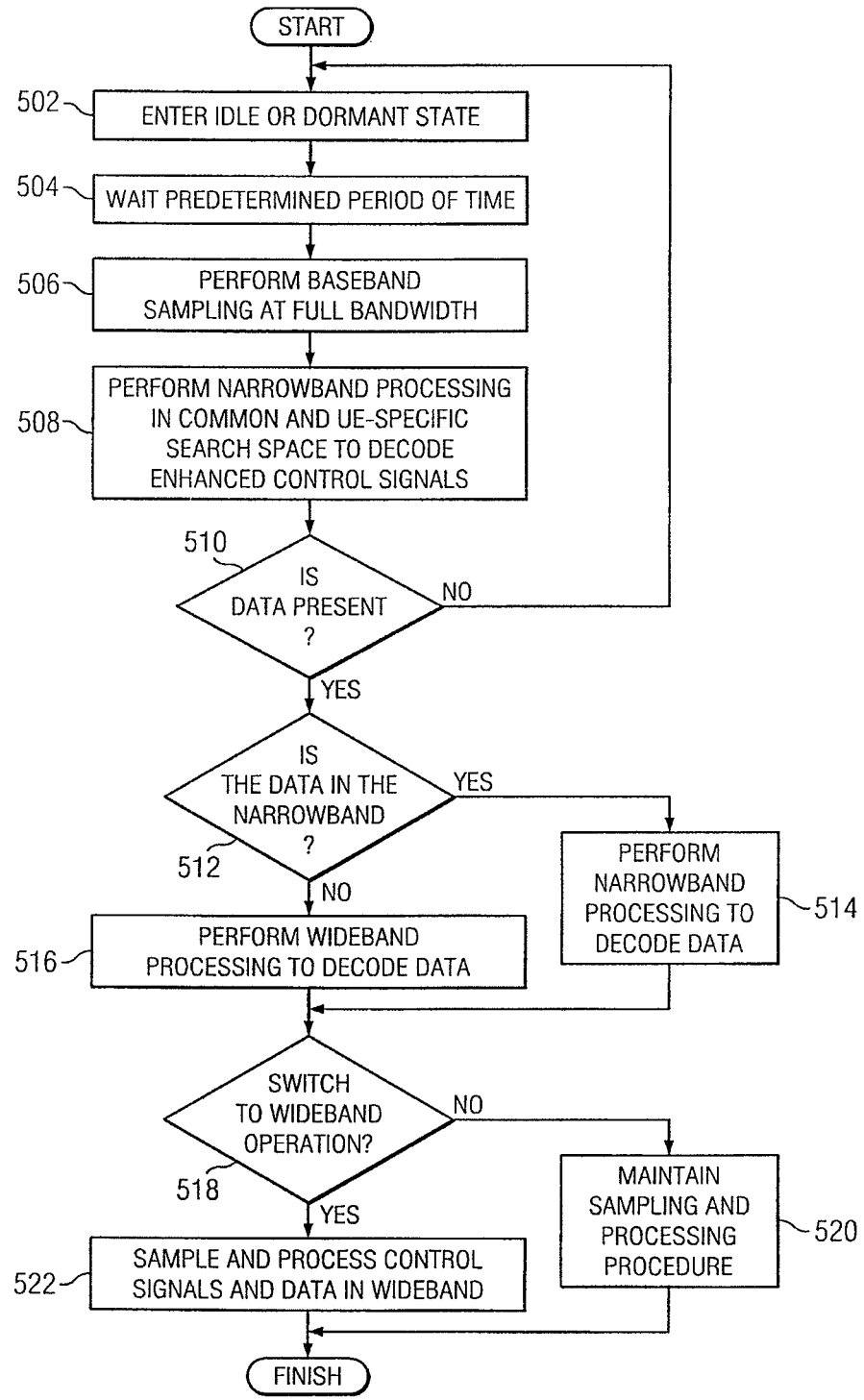
FIG. 5 depicts an example method for processing control signals and data signals that may be performed by the narrowband endpoint of FIG. 1.

FIG. 5 depicts an example method for processing control signals and data signals that may be performed by the narrowband endpoint 104b. Steps 502 and 504 are similar to steps 402 and 404 of FIG. 4. At step 506, endpoint 104b performs baseband sampling at full bandwidth. That is, endpoint 104b samples a transmission from transmission site 102 at a sufficient rate to recover the entire frequency range. While this may require a faster ADC sampling rate and additional memory to store the samples as compared to baseband sampling at the narrowband, this method allows data signals sent to the endpoint 104b to be included in the wideband portion of the frequency range on the first transmission, as explained in greater detail below.

At step 508, narrowband processing in the common search space and the endpoint-specific search space is performed to decode enhanced control signals transmitted using subcarrier frequencies within the narrowband. This step may be similar to step 408 of FIG. 4. At step 510, it is determined whether data for the endpoint 104b is included in the communication. If there is no data present, the method returns to step 502. If there is data present, endpoint 104b determines whether the data is limited to the narrowband portion of the frequency range. That is, endpoint 104b may determine whether data signals for the endpoint are transmitted using only subcarrier frequencies in the narrowband. If so, step 514, which is similar to step 412, is performed. If at least one data signal is transmitted using subcarrier frequencies outside of the narrowband, then wideband processing is performed to decode the data signals. The wideband processing may include any suitable operations that facilitate decoding of the data signals. For example, processing may include filtering the sampled signals, performing discrete fourier transforms (DFT) on the sampled signals, demodulation of the sampled signals, or other suitable processing. Wideband processing may include more complex processing than narrowband processing. For example, wideband processing may include performing larger DFTs on the sampled signals. Wideband processing results in the recovery of data signals transmitted using subcarrier frequencies that are outside of the narrowband portion of the frequency range. In particular embodiments, enhanced control signals located within the narrowband portion of the frequency range may specify blocks outside of the narrowband that include data signals for the endpoint 104b. The endpoint 104b may use this information to decode these blocks to recover the data signals.

At step 518, endpoint 104b determines whether wideband operation should be performed. This step may be similar to step 414 of FIG. 4. If endpoint 104b determines that it should not change its configuration to wideband operation, endpoint 104b maintains its sampling and processing procedure at step 520. For example, endpoint 104b may continue processing communications in the manner described in steps 502-516. If endpoint 104b determines that it should change its configuration to wideband operation, then the endpoint samples and processes future communications from transmission site 102 in a wideband mode. That is, endpoint 104 will perform sampling on the entire frequency range and will decode signals transmitted via any of the subcarrier frequencies of the frequency range, including those outside of the narrowband.

The method of FIG. 5 allows data signals to be transmitted using subcarrier frequencies outside of the narrowband to an endpoint that is only configured to decode control signals transmitted via subcarrier frequencies located in the narrowband. Such embodiments may speed up the data transfer process.

Some of the steps illustrated in FIG. 5 may be combined, modified or deleted where appropriate, and additional steps may also be added to the flowchart. Any of the steps may be repeated. Additionally, steps may be performed in any suitable order without departing from the scope of particular embodiments. Moreover, two or more of the steps of the method may be performed simultaneously in particular embodiments. Although, the steps of FIG. 5 have been described with respect to an endpoint 104, they may be performed by any suitable transceiver.

Various embodiments of the present disclosure may provide one or more technical advantages. Technical advantages of particular embodiments include performing less complex computations when sampling and processing a communication from a transmission site. Another technical advantage may include a decreased cost for manufacturing an endpoint. Another technical advantage may include less power consumption. Other technical advantages will be readily apparent to one of ordinary skill in the art from the following figures, descriptions, and claims. Moreover, while specific advantages have been enumerated above, various embodiments may include all, some, or none of the enumerated advantages.

Although particular embodiments have been described in detail, it should be understood that various other changes, substitutions, and alterations may be made hereto without departing from the spirit and scope of particular embodiments. For example, although an embodiment has been described with reference to a number of elements included within transmission site 102 and endpoints 104 such as a processors, memories, storages, interfaces, and buses, these elements may be combined, rearranged or positioned in order to accommodate particular wireless architectures or needs. In addition, any of these elements may be provided as separate external components to transmission site 102, endpoints 104, or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A transceiver comprising:
a processor configured to:
for each data signal of a plurality of data signals, schedule at least one time and at least one set of subcarrier frequencies selected from a frequency range to be used to transmit the data signal;
generate a plurality of control signals, each control signal addressed to at least one endpoint of a plurality of endpoints and indicating the scheduled at least one time and at least one set of subcarrier frequencies to be used to transmit one or more of the plurality of data signals to the at least one endpoint of the plurality of endpoints;
for each control signal of the plurality of control signals, schedule at least one time and at least one set of frequencies selected from the frequency range to be used to transmit the control signal, wherein at least one of the plurality of control signals and at least one of the plurality of data signals are multiplexed and scheduled to be transmitted simultaneously by the transceiver;
determine that a first endpoint of the plurality of endpoints is not configured to decode control signals of the plurality of control signals that are transmitted using one or more subcarrier frequencies located outside a narrowband portion of the frequency range; and
limit the scheduling of one or more control signals of the plurality of control signals that are addressed to the first endpoint to be transmitted by one or more subcarrier frequencies within the narrowband portion of the frequency range; and
an interface coupled to the processor and configured to transmit the plurality of data signals and the plurality of control signals to the plurality of endpoints.

2. The transceiver of claim 1, the processor further configured to determine that a second endpoint of the plurality of endpoints is configured to decode control signals of the plurality of control signals that are transmitted using one or more subcarrier frequencies located outside the narrowband portion of the frequency range.

3. The transceiver of claim 1, wherein the narrowband portion of the frequency range includes the center frequency of the frequency range.

4. The transceiver of claim 1, wherein the processor is further configured to schedule at least one synchronization signal for periodic transmission using at least one set of contiguous frequencies that are within the narrowband portion of the frequency range.

5. The transceiver of claim 1, wherein at least one of the plurality of control signals indicates a code rate and modulation scheme of one or more of the plurality of data signals.

6. The transceiver of claim 1, wherein the processor is further configured to:
determine that the first endpoint has changed its configuration to decode control signals of the plurality of control signals that are transmitted using one or more subcarrier frequencies located outside the narrowband portion of the frequency range; and
schedule at least one control signal of the plurality of control signals that is addressed to the first endpoint for transmission using one or more subcarrier frequencies located outside the narrowband portion of the frequency range.

7. A method comprising:
for each data signal of a plurality of data signals, schedule, by a transceiver, at least one time and at least one set of subcarrier frequencies selected from a frequency range to be used to transmit the data signal;
generate, by the transceiver, a plurality of control signals, each control signal addressed to at least one endpoint of a plurality of endpoints and indicating the scheduled at least one time and at least one set of subcarrier frequencies to be used to transmit one or more of the plurality of data signals to the at least one endpoint of the plurality of endpoints;
for each control signal of the plurality of control signals, schedule at least one time and at least one set of frequencies selected from the frequency range to be used to transmit the control signal, wherein at least one of the plurality of control signals and at least one of the plurality of data signals are multiplexed and scheduled to be transmitted simultaneously by the transceiver;
determining that a first endpoint of the plurality of endpoints is not configured to decode control signals of the plurality of control signals that are transmitted using one or more subcarrier frequencies located outside a narrowband portion of the frequency range;
limiting the scheduling of one or more control signals of the plurality of control signals that are addressed to the first endpoint to be transmitted by one or more subcarrier frequencies within the narrowband portion of the frequency range; and
transmitting, by the transceiver, the plurality of data signals and the plurality of control signals to the plurality of endpoints.

8. The method of claim 7, further comprising determining that a second endpoint of the plurality of endpoints is configured to decode control signals of the plurality of control signals that are transmitted using one or more subcarrier frequencies located outside the narrowband portion of the frequency range.

9. The method of claim 7, wherein the narrowband portion of the frequency range includes the center frequency of the frequency range.

10. The method of claim 7, further comprising scheduling at least one synchronization signal for periodic transmission using at least one set of contiguous frequencies that are within the narrowband portion of the frequency range.

11. The method of claim 7, wherein at least one of the plurality of control signals indicates a code rate and modulation scheme of one or more of the plurality of data signals.

12. The method of claim 7, further comprising:
determining that the first endpoint has changed its configuration to decode control signals of the plurality of control signals that are transmitted using one or more subcarrier frequencies located outside the narrowband portion of the frequency range; and
scheduling at least one control signal of the plurality of control signals that is addressed to the first endpoint for transmission using one or more subcarrier frequencies located outside the narrowband portion of the frequency range.

13. One or more non-transitory computer-readable storage media embodying logic that when executed by a processor is configured to:

for each data signal of a plurality of data signals, schedule at least one time and at least one set of subcarrier frequencies selected from a frequency range to be used to transmit the data signal;

generate a plurality of control signals, each control signal addressed to at least one endpoint of a plurality of endpoints and indicating the scheduled at least one time and at least one set of subcarrier frequencies to be used to transmit one or more of the plurality of data signals to the at least one endpoint of the plurality of endpoints;

for each control signal of the plurality of control signals, schedule at least one time and at least one set of frequencies selected from the frequency range to be used to transmit the control signal, wherein at least one of the plurality of control signals and at least one of the plurality of data signals are multiplexed and scheduled to be transmitted simultaneously by the transceiver;

determine that a first endpoint of the plurality of endpoints is not configured to decode control signals of the plurality of control signals that are transmitted using one or more subcarrier frequencies located outside a narrowband portion of the frequency range;

limit the scheduling of one or more control signals of the plurality of control signals that are addressed to the first endpoint to be transmitted by one or more subcarrier frequencies within the narrowband portion of the frequency range; and transmit the plurality of data signals and the plurality of control signals to the plurality of endpoints.

14. The media of claim 13, the logic further configured to determine that a second endpoint of the plurality of endpoints is configured to decode control signals of the plurality of control signals that are transmitted using one or more subcarrier frequencies located outside the narrowband portion of the frequency range.

15. The media of claim 13, wherein the narrowband portion of the frequency range includes the center frequency of the frequency range.

16. The media of claim 13, the logic further configured to schedule at least one synchronization signal for periodic transmission using at least one set of contiguous frequencies that are within the narrowband portion of the frequency range.

17. The media of claim 13, wherein at least one of the plurality of control signals indicates a code rate and modulation scheme of one or more of the plurality of data signals.

18. The media of claim 13, the logic further configured to:
    determine that the first endpoint has changed its configuration to decode control signals of the plurality of control signals that are transmitted using one or more subcarrier frequencies located outside the narrowband portion of the frequency range; and
    schedule at least one control signal of the plurality of control signals that is addressed to the first endpoint for transmission using one or more subcarrier frequencies located outside the narrowband portion of the frequency range.

* * * * *